United States Patent [19]

Iuchi

[11] Patent Number: 5,615,371
[45] Date of Patent: Mar. 25, 1997

[54] DEBUG PROCESSING SYSTEM FOR USER PROGRAMS

[75] Inventor: Hitoshi Iuchi, Tokyo, Japan

[73] Assignee: NEC Corporation, Tokyo, Japan

[21] Appl. No.: 431,262

[22] Filed: Apr. 28, 1995

[30] Foreign Application Priority Data

Apr. 28, 1994 [JP] Japan ................................ 6-113593

[51] Int. Cl.⁶ ............................................ G06F 9/45
[52] U.S. Cl. ............. 395/704; 395/183.11; 395/183.14; 364/DIG. 1; 364/267.91
[58] Field of Search ............................. 395/700, 183.11, 395/183.14

[56] References Cited

U.S. PATENT DOCUMENTS 4,866,665  9/1989  Haswell-Smith ................ 364/900
5,124,989  6/1992  Padawer et al. ................. 371/19
5,379,419  1/1995  Heffernan et al. ............... 395/600
5,418,941  5/1995  Peters ............................. 395/575

*Primary Examiner*—Kevin A. Kriess
*Assistant Examiner*—Kakali Chaki
*Attorney, Agent, or Firm*—Young & Thompson

[57] ABSTRACT

Command analysis means 3, upon perception of a save command, calls commit means 4, currency information saving means 6 and variables information saving means 8, and after that calls stack information saving means 10. Each called means commits an output file, or saves the currency information of an input file, variables information or stack information. The command analysis means 3, upon perception of a restore command, calls rollback means 5, currency information restoring means 7 and variables information restoring means 9, and after that calls stack information restoring means 11. Each called means rolls back the output file, or restores the currency information of the input file, variables information or stack information.

12 Claims, 3 Drawing Sheets

DEBUG PROCESSING SYSTEM FOR USER PROGRAMS

BACKGROUND OF THE INVENTION

1. Field of the Invention

The present invention relates to a debug processing system for user programs in operating systems, and more particularly to a debug processing system for user programs which performs debugging at a break point set in each user program.

2. Description of the Related Art

The following technique is disclosed in the Japanese Kokai No. 5-181702.

At a break point or function designator step of a program, the contents of the register and the memory of the program are registered in the memory means for debugging. When the program is to be re-executed from the break point after debugging, the contents of the register and the memory of the program stored in the memory means, are returned to the register and the memory of the program.

However, according to this conventional debugging technique, the contents of the output file which the program was accessing at the break point and currency information (currency designator) in the input file, which designates a record, are not saved.

For this reason, according to this conventional debugging technique, when the user is to re-execute the program from the break point, or to resume debugging from the break point, the contents of the output file which the program was accessing at the break point and the currency information of the input file cannot be restored. As a result, there is the problem that the program is re-executed from the break point or no debugging can be resumed from the break point.

This problem gives rise to the problem that the user has to perform debugging again from the beginning by re-executing the program and another problem of deteriorating the efficiency of debug processing.

Incidentally, in the context of the present invention, the currency information of the input file means the information which designates the record in the input file to be accessed next. Variables information means the information indicating the contents of the variables on the memory to be used by the user program. Further, stack information is the information for managing the sequence of the execution of the user program, indicating among other things the contents of the stack area in the memory.

SUMMARY AND OBJECTS OF THE INVENTION

An object of the present invention is to make it possible to resume debugging of the user program from the break point and thereby to improve the efficiency of debug processing.

A first user program debug processing system according to the invention has the following configuration.

A user program debug processing system for performing debugging by setting a break point in a user program, comprising:

command analysis means for perceiving, at said break point, a command entered from a terminal to be a save command;

commit means for committing, when the input of the save command is perceived by said command analysis means, the output file accessed by the user program at the break point;

currency information saving means for saving, when the input of the save command is perceived by said command analysis means, currency information designating a record at the break point of the input file accessed by the user program, into a currency information saving area;

variables information saving means for saving, when the input of the save command is perceived by said command analysis means, variables information, which is the contents of the variables on the memory used by the user program at the break point, into a variables information saving area; and stack information saving means for saving, when the input of the save command is perceived by said command analysis means, stack information which is called after the completion of processing by said commit means, said currency information saving means and said variables information saving means and is intended for managing the sequence of the execution of the user program at the break point, into a stack information saving area.

A second user program debug processing system according to the invention has the following configuration.

A user program debug processing system for performing debugging by setting a break point in a user program, comprising:

command analysis means for perceiving, at said break point, a command entered from a terminal to be a save command;

commit means for committing, when the input of the save command is perceived by said command analysis means, the output file accessed by the user program at the break point, and attaching the identifier for said break point to that commit information;

currency information saving means for attaching, when the input of the save command is perceived by said command analysis means, the identifier for said break point to currency information designating a record at the break point of the input file accessed by the user program, and saving the currency information into a currency information saving area;

variables information saving means for attaching, when the input of the save command is perceived by said command analysis means, the identifier for said break point to variables information, which is the contents of the variables on the memory used by the user program at the break point, and saving the variables information into a variables information saving area; and stack information saving means for attaching, when the input of the save command is perceived by said command analysis means, the identifier for said break point to stack information which is called after the completion of processing by said commit means, said currency information saving means and said variables information saving means and is intended for managing the sequence of the execution of the user program at the break point, and saving the stack information into a stack information saving area.

A third user program debug processing system according to the invention has the following constituent element in the first user program debug processing system:

area securing means for securing, at the time the debugging of said user program is started, said currency information saving area, said variables information saving area and said stack information saving area.

A fourth user program debug processing system according to the invention has the following constituent element in the second user program debug processing system:

area securing means for securing, at the time the debugging of said user program is started, said currency information saving area, said variables information saving area and said stack information saving area.

A fifth user program debug processing system according to the invention has the following constituent element in the first user program debug processing system:

area securing means for securing, at the time the saving command is entered, said currency information saving area, said variables information saving area and said stack information saving area.

A sixth user program debug processing system according to the invention has the following constituent element in the second user program debug processing system:

area securing means for securing, at the time the save command is entered, said currency information saving area, said variables information saving area and said stack information saving area.

A seventh user program debug processing system according to the invention has the following configuration.

A user program debug processing system for performing debugging by setting a break point in a user program, comprising:

command analysis means for perceiving, at the break point, a command entered from a terminal to be a save command or the command entered from the terminal to be a restore command having the break point attached to it;

commit means for committing, when the input of the save command is perceived by said command analysis means, the output file accessed by the user program at the break point;

currency information saving means for saving, when the input of the save command is perceived by said command analysis means, currency information designating a record at the break point of the input file accessed by the user program, into a currency information saving area;

variables information saving means for saving, when the input of the save command is perceived by said command analysis means, variables information, which is the contents of the variables on the memory used by the user program at the break point, into a variables information saving area;

stack information saving means for saving, when the input of the save command is perceived by said command analysis means, stack information which is called after the completion of processing by said commit means, said currency information saving means and said variables information saving means and is intended for managing the sequence of the execution of the user program at the break point, into a stack information saving area;

rollback means for rolling back, when the input of the restore command is perceived by said command analysis means, the output file committed by said commit means to the break point;

currency information restoring means for restoring, when the input of the restore command is perceived by said command analysis means, the currency information saved into said currency information saving area by said currency information saving means;

variables information restoring means for restoring, when the input of the restore command is perceived by said command analysis means, the variables information saved into said variables information saving means; and stack information restoring means for restoring, when the input of the restore command is perceived by said command analysis means, the stack information which was called after the completion of processing by said rollback means, said currency information restoring means and said variables information restoring means and saved into said stack information saving area by stack information saving means.

An eighth user program debug processing system according to the invention has the following configuration.

A user program debug processing system for performing debugging by setting a break point in a user program, comprising:

command analysis means for perceiving, at the break point, a command entered from a terminal to be a save command or the command entered from the terminal to be a restore command having the break point attached to it;

commit means for committing, when the input of the save command is perceived by said command analysis means, the output file accessed by the user program at the break point, and attaching an identifier of said break point to said commit information;

currency information saving means for attaching, when the input of the save command is perceived by said command analysis means, the identifier of said break point to currency information designating a record at the break point of the input file accessed by the user program, and saving the currency information into a currency information saving area;

variables information saving means for attaching, when the input of the save command is perceived by said command analysis means, the identifier of said break point to variables information, which is the contents of the variables on the memory used by the user program at the break point, and saving the variables information into a variables information saving area;

stack information saving means for attaching, when the input of the save command is perceived by said command analysis means, the identifier of said break point to stack information which is called after the completion of processing by said commit means, said currency information saving means and said variables information saving means and is intended for managing the sequence of the execution of the user program at the break point, and saving the stack information into a stack information saving area;

rollback means for rolling back, when the input of the restore command is perceived by said command analysis means, the output file committed by said commit means to the break point indicated by said restore command;

currency information restoring means for restoring to the state of the break point indicated by said restore command, when the input of the restore command is perceived by said command analysis means, the currency information saved into said currency information saving area by said currency information saving means;

variables information restoring means for restoring to the state of the break point indicated by said restore command, when the input of the restore command is perceived by said command analysis means, the variables information saved into said variables information saving means; and stack information restoring means for restoring to the state of the break point indicated by said restore command, when the input of the restore command is perceived by said command analysis means, the stack information which was called after the completion of processing by said rollback means, said currency information restoring means and said variables information restoring means and saved into said stack information saving area by said stack information saving means.

A ninth user program debug processing system according to the invention has the following constituent elements in the seventh user program debug processing system:

area securing means for securing, at the time the debugging of said user program is started, said currency information saving area, said variables information saving area and said stack information saving area; and area releasing means for releasing, at the time the debugging of said user program is completed, said currency information saving area, said variables information saving area and said stack information saving area.

A tenth user program debug processing system according to the invention has the following constituent elements in the eighth user program debug processing system:

area securing means for securing, at the time the debugging of said user program is started, said currency information saving area, said variables information saving area and said stack information saving area; and area releasing means for releasing, at the time the debugging of said user program is completed, said currency information saving area, said variables information saving area and said stack information saving area.

An eleventh user program debug processing system according to the invention has the following constituent elements in the seventh user program debug processing system:

area securing means for securing, at the time the save command is entered, said currency information saving area, said variables information saving area and said stack information saving area; and area releasing means for releasing, at the time the restoration processing according to said restore command is completed, said currency information saving area, said variables information saving area and said stack information saving area.

A twelfth user program debug processing system according to the invention has the following constituent elements in the eighth user program debug processing system:

area securing means for securing, at the time the save command is entered, said currency information saving area, said variables information saving area and said stack information saving area; and area releasing means for releasing, at the time the restoration processing according to said restore command is completed, said currency information saving area, said variables information saving area and said stack information saving area.

BRIEF DESCRIPTION OF THE DRAWINGS

The present invention will be understood more fully from the detailed description given here blow and from the accompanying drawings of preferred embodiments of the invention, which, however, should not be considered as limiting the invention but are only for explanation and understanding.

Here, it should be noted that like reference numerals represent like elements throughout the disclosure.

DETAILED DESCRIPTION OF THE PREFERRED EMBODIMENT

A preferred embodiment of the present invention will be described in detail below with reference to drawings.

Figure 1:
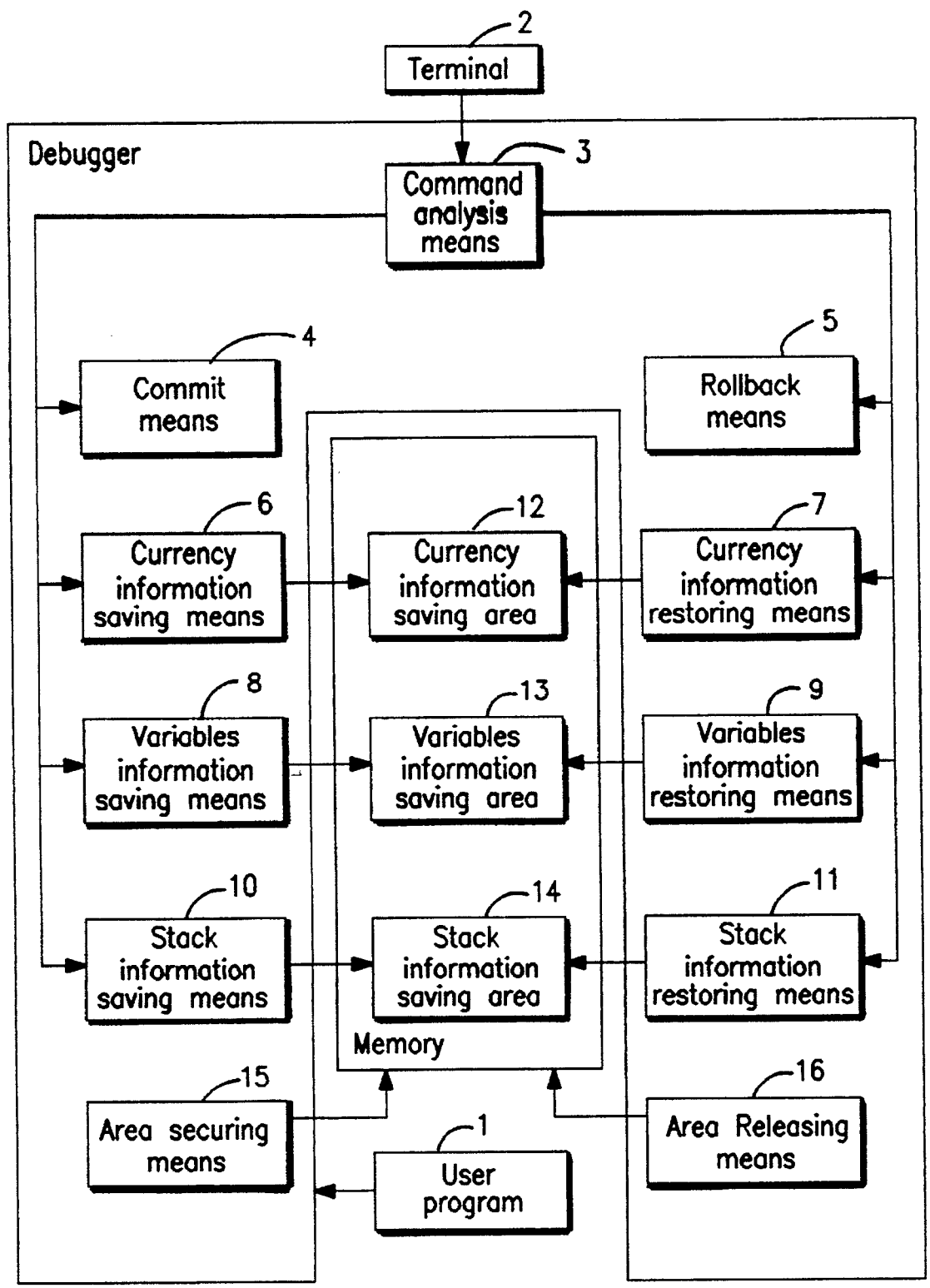
FIG. 1 is a block diagram illustrating a preferred embodiment of the invention.

Referring to FIG. 1, a debug processing system for user programs, which is an embodiment of the invention consists of a user program 1, into which data are entered from an input file, for supplying data to an output file; a terminal 2; command analysis means 3 for analyzing a command entered from the terminal 2; a commit means 4 for committing the output file at the time of a break point; rollback means 5 for rolling back the output file to its state at the time of the break point; currency information saving means 6 for saving-the currency information of the input file accessed by the user program at the time of the break point; currency information restoring means 7 for restoring the currency information of the input file saved by the currency saving means 6; variables information saving means 8 for saving the variables information of the user program at the time of the break point; variables information restoring means 9 for restoring the variables information of the user program saved by the variables information saving means 9; stack information saving means 10 for saving the stack information of the user program at the time of the break point; stack information restoring means 11 for restoring the stack information of the user program saved by the stack information saving means 10; a currency information saving area 12 for saving the currency information of the input file accessed by the user program; a variables information saving area 13 for saving the variables information of the user program; a stack information saving area 14 for saving the stack information of the user program; area securing means 15 for securing the currency information saving area 12, the variables information saving area 13 and the stack information saving area 14; and area releasing means for releasing the currency information saving area 12, the variables information saving area 13 and the stack information saving area 14.

The command analysis means 3, commit means 4, rollback means 5, currency information saving means 6, currency information restoring means 7, variables information saving means 8, variables information restoring means 9, stack information saving means 10, stack information restoring means 11, area securing means 15 and area releasing means 16 are realized on a debugger, which is a function of the operation system. The currency information saving area 12, variables information saving area 13 and stack information saving area 14 are realized in areas of a memory for the user program 1 managed by the operating system.

Figure 2:
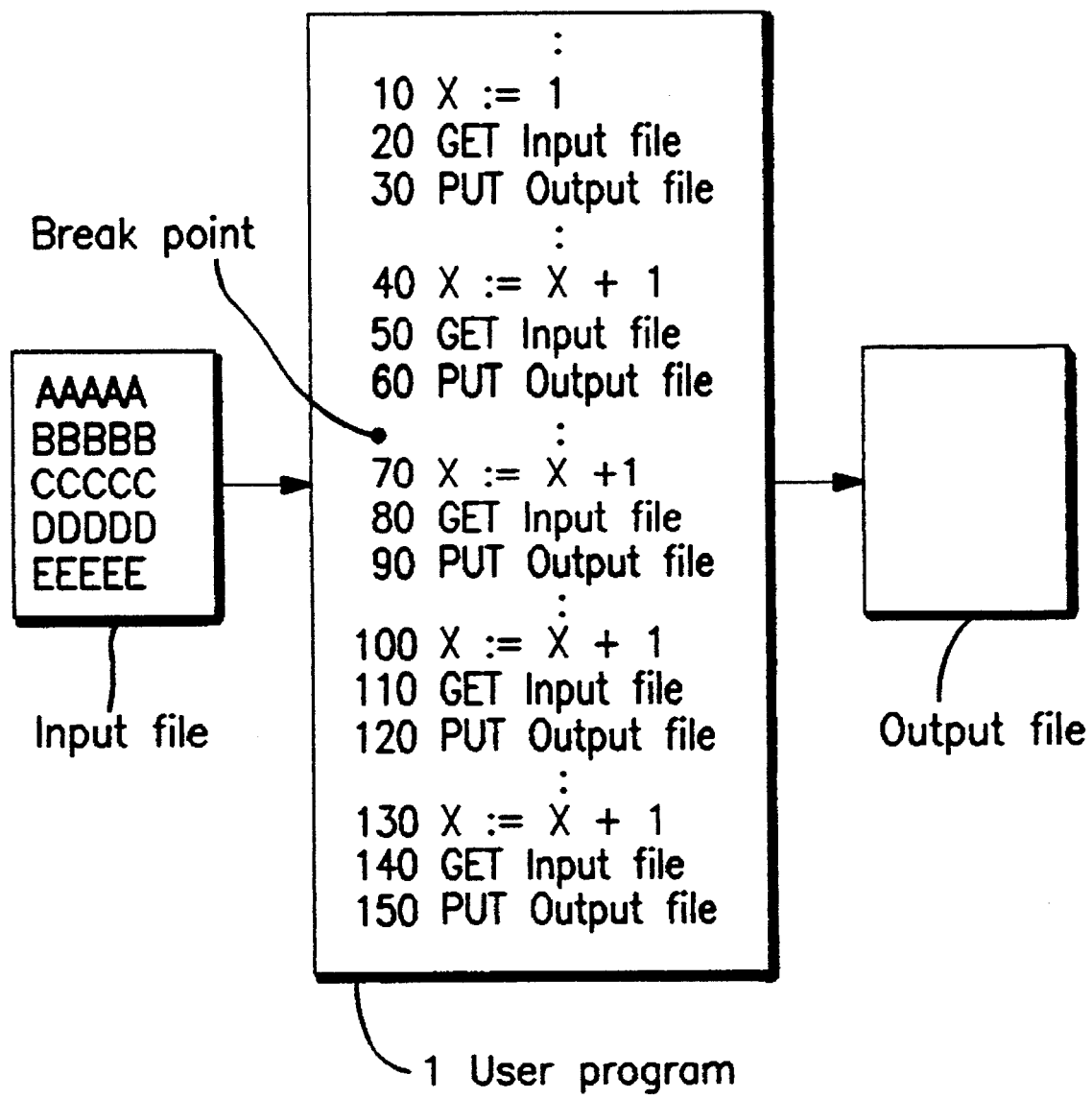
FIG. 2 is a diagram illustrating one example of the user program 1 in the preferred embodiment of the invention.

FIG. 2 is a diagram illustrating one example of the user program 1. This user program 1, into which data are entered from an input file, supplies data to an output file. It is assumed that any user program which is to be debugged by the debug processing system of the user program according to the invention is a program to access output files and input files as this user program 1 does. However, it is possible to apply the invention also to a user program which does not access both output and input files or accesses neither of them.

It is further assumed that, in this embodiment, one break point is set immediately before the 70th line of this user program 1.

Next will be described the debug processing system for user programs, which is an embodiment of the present invention, with reference to FIGS. 1 through 4.

First, at the beginning of the debugging of the user program 1, the area securing means 15 in the debugger secures on a memory the currency information saving area 12, variables information saving area 13 and stack information saving area 14.

Next will be described the operation which takes place, during the debugging of the user program 1, when a command indicating "saving of information at a break point" (hereinafter referred to as "save command") is entered from the terminal 2 at the break point on the 70th line in FIG. 2.

The command analysis means 3 perceives, by analytical processing of the command, that the command entered from the terminal 2 is a save command (step 31).

The command analysis means 3, on the basis of the perception of the inputting of the save command, first calls the commit means 4 (step 32).

The commit means 4, called by the command analysis means 3, commits the output file accessed by the user program 1 at the break point (step 33). Incidentally in FIGS. 1 and 2, illustration of a log file used for commit/rollback is dispensed with.

The commit means 4, after completion of step 33, returns the control to the command analysis means 3.

Next the command analysis means 3 calls the currency information saving means 6 (step 34).

The currency information saving means 6, called by the command analysis means 3, saves the currency information of the input file accessed by the user program 1 at the break point (here it is supposed to be information indicating record "CCCCC" in the input file) from an area in the memory managed by the operating system to the currency information saving area 12 (step 35).

The currency information saving means 6, after the completion of step 35, returns the control to the command analysis means 3.

Next the command analysis means 3 calls the variables information saving means 8 (step 36).

The variables information saving means 8, called by the command analysis means 3, saves the variables information of the user program 1 at the break point (here it is supposed to be information indicating that variable "X" is "2") from an area in the memory of the user program 1 to the variables information saving area 13 (step 37).

The variables information saving means 8, after the completion of step 37, returns the control to the command analysis means 3.

Next the command analysis means 3 calls the stack information saving means 10 (step 38).

The stack information saving means 10, called by the command analysis means 3, saves the stack information of the user program 1 at the break point (here it is supposed to be information of a program counter indicating the 70th line, etc.) from registers, such as a program counter, and the stack area in the memory to the stack information saving area 13 (step 39).

The stack information saving means 10, after the completion of step 39, returns the control to the command analysis means 3. Now the command analysis means 3 has completed the whole processing in response to the inputting of the save command.

Figure 3:
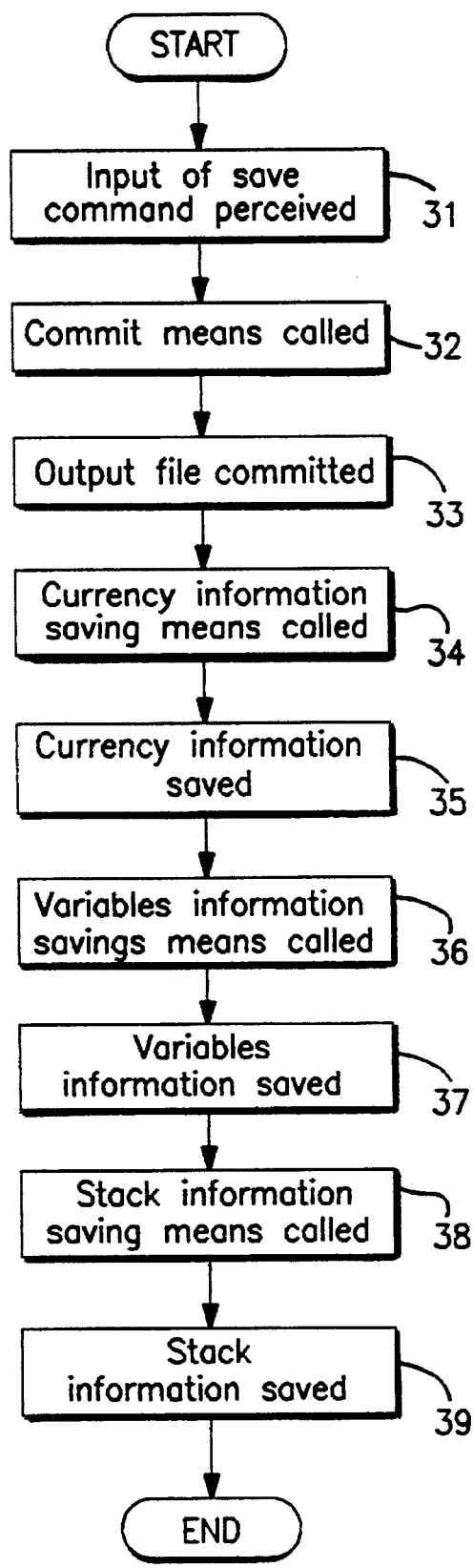
FIG. 3 is a flow chart showing the processing by the command analysis means 3, commit means 4, currency information saving means 6, variables information saving means 8 and stack information saving means 10.

Incidentally, the sequence of calling of the commit means 4, currency information saving means 6 and variables information saving means 8 by the command analysis means 3 is not limited to the sequence shown in FIG. 3, provided that the processing to save stack information by the stack information saving means 10 should be accomplished after the completion of the processing by the commit means 4, currency information saving means 6 and variables information saving means 8, so that proper execution of the user program 1 be ensured after the resumption of debugging from the break point.

Next will be described the operation which takes place, during the debugging of the user program 1, when a command indicating "restoration of information at a break point" (hereinafter referred to as "restore command") is entered from the terminal 2 in order to redo debugging from the the 70th line in FIG. 2.

The command analysis means 3 perceives, by analytical processing of the command, that the command entered from the terminal 2 is a restore command (step 41).

The command analysis means 3, on the basis of the perception of the inputting of the restore command, first calls the rollback means 5 (step 42).

The rollback means 5, called by the command analysis means 3, rolls back the output file committed by the commit means 4 to the break point (the time when the save command was entered) (step 43).

The rollback means 5, after completion of step 43, returns the control to the command analysis means 3.

Next the command analysis means 3 calls the currency information restoring means 7 (step 44).

The currency information restoring means 7, called by the command analysis means 3, restores the currency information saved in the currency information saving area 12 (information indicating record "CCCCC" in the input file) into an area in the memory managed by the operating system (step 45).

The currency information restoring means 7, after the completion of step 45, returns the control to the command analysis means 3.

Next the command analysis means 3 calls the variables information restoring means 9 (step 46).

The variables information restoring means 9, called by the command analysis means 3, restores the variables information saved in the variables information saving area 13 (information indicating that variable "X" is "2") into an area in the memory of the user program 1 (step 47).

The variables information restoring means 9, after the completion of step 47, returns the control to the command analysis means 3.

Next the command analysis means 3 calls the stack information restoring means 11 (step 48).

The stack information restoring means 11, called by the command analysis means 3, restores the stack information saved in the stack information saving area 14 (information of a program counter indicating the 70th line, etc.) into registers, such as a program counter, and the stack area in the memory (step 49).

The stack information restoring means 11, after the completion of step 49, returns the control to the command analysis means 3. Now the command analysis means 3 has completed the whole processing in response to the inputting of the restore command.

Figure 4:
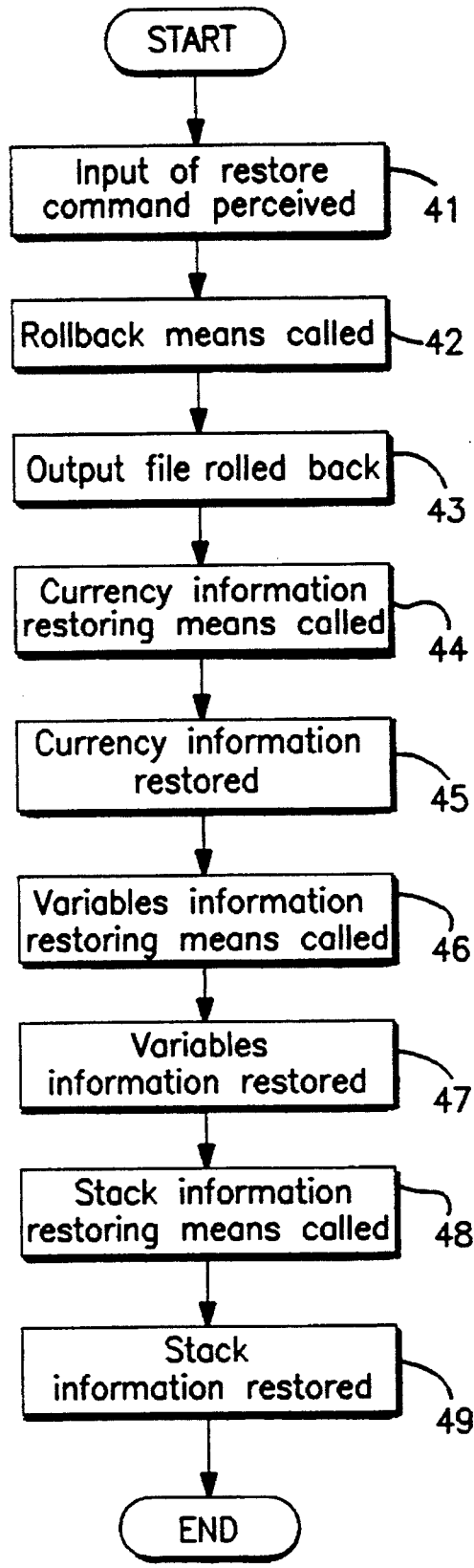
FIG. 4 is a flow chart showing the processing by the command analysis means 3, rollback means 5, currency information restoring means 7, variables information restoring means 9 and stack information restoring means 11.

Incidentally, the sequence of calling of the rollback means 5, currency information restoring means 7 and variables information restoring means 9 by the command analysis means 3 is not limited to the sequence shown in FIG. 4, provided that the processing to restore stack information by the stack information saving means 11 should be accomplished after the completion of the processing by the rollback means 5, currency information restoring means 7 and variables information restoring means 9, so that proper execution of the user program 1 be ensured after the resumption of debugging from the break point.

Upon completion of debugging of the user program 1, the area releasing means 16 in the debugger releases the currency information saving area 12, variables information saving area 13 and stack information saving area 14.

Incidentally, the timing of securing the currency information saving area 12, variables information saving area 13 and stack information saving area 14 is not limited to the starting time of debugging as in this embodiment. It is desirable, however, from the viewpoint of improving the processing efficiency of saving (processing by the currency information saving means 6, variables information saving means 8 and stack information saving means 10), to secure them at the starting time of debugging. Similarly the timing of releasing the currency information saving area 12, variables information saving area 13 and stack information saving area 14 is not limited to the ending time of debugging as in this embodiment. It is desirable, however, from the viewpoint of improving the processing efficiency of restoration (processing by the currency information restoring means 7, variables information restoring means 9 and stack information restoring means 11), to release them at the ending time of debugging.

The area securing means 15 may as well secure the currency information saving area 12, variables information saving area 13 and stack information saving area 14 at the time the save command is entered, and the area releasing means 16, release the currency information saving area 12, variables information saving area 13 and stack information saving area 14 upon completion of restore processing in accordance with the restore command. These sequences have the advantage of enabling the areas on the memory to be used more efficiently.

Incidentally, this embodiment has been described with reference to a case in which there is only one break point for save processing and restore processing (including processing by the commit means 4 and roll back means 5). However, it is also possible to apply the user program debug processing system according to the present invention to a case in which there are a plurality of break points for save processing and restore processing. In such a case, the mode of processing according to (1) through (4) below is adopted.

(1) The commit means 4, currency information saving means 6, variables information saving means 8 and stack information saving means 10, perceiving the identifying information indicating the break point at the time the save command is entered, commits the output file so that the identifying information be contained, and saves the currency information, variables information and stack information.

(2) To the restore command entered from the terminal 2 is added the identifying information of the break point, which will serve as the starting point to resume debugging, and the command analysis means 3 perceives, in accordance with the restore command, the break point for which restore processing should be performed.

(3) The rollback means 5, currency information restoring means 7, variables information restoring means 9 and stack information restoring means 11, receiving from the command analysis means 3 the identifying information of the break point added to the restore command, rolls back the output file with respect to that break point, and restores the currency information of the input file, variables information and stack information.

(4) The currency information saving area 12, variables information saving area 13 and stack information saving area 14 are so architected as to make possible setting of a plurality each of currency information units, variables information units and stack information units corresponding to the plurality of break points.

Thus is completed the processing by the debug processing system for user programs, which is a preferred embodiment of the present invention.

A characteristic of this embodiment of the invention, which is a debug processing system for user programs, consists in that the command analysis means 3, when it perceives a save command, calls the commit means 4, currency information saving means 6 and variables information saving means 8, and after that calls the stack information saving means 10. Each called means commits the output file, or saves the currency information of the input file, variables information or stack information.

Another characteristic consists in that the command analysis means 3, when it perceives a restore command, calls the rollback means 5, currency information restoring means 7 and variables information restoring means 9, and after that calls the stack information restoring means 11. Each called means rolls back the output file, or restores the currency information of the input file, variables information or stack information.

By virtue of these characteristics, the debug processing system for user programs, which is a preferred embodiment of the invention, has the advantage of being able to resume debugging of a user program from the break point.

It has another advantage of being able to improve the efficiencies of save processing and restore processing by securing each save area at the time debugging is started and releasing each save area at the time debugging is completed.

It has still another advantage of being able to improve the efficiency of the use of areas on the memory by securing each save area at the time a save command is entered and releasing each save area at the time restore processing based on a restore command is completed.

As hitherto described, the debug processing system for user programs according to the present invention has the advantages of permitting resumption of user program debugging from the break point and thereby improving the efficiency of debug processing.

Although the invention has been described in detail above with reference to a preferred embodiment thereof, it will be appreciated by those skilled in the art that this embodiment has been provided solely for the purpose of illustration, and is in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A user program debug processing system for performing debugging by setting a break point in a user program, comprising:

command analysis means for perceiving, at said break point, a command entered from a terminal to be a save command;

commit means for committing, when the input of the save command is perceived by said command analysis means, the output file accessed by the user program at the break point;

currency information saving means for saving, when the input of the save command is perceived by said command analysis means, currency information designating a record at the break point of the input file accessed by the user program, into a currency information saving area;

variables information saving means for saving, when the input of the save command is perceived by said command analysis means, variables information, which is the contents of the variables on the memory used by the user program at the break point, into a variables information saving area; and stack information saving means for saving, when the input of the save command is perceived by said command analysis means, stack information which is called after the completion of processing by said commit means, said currency information saving means and said variables information saving means and is intended for managing the sequence of the execution of the user program at the break point, into a stack information saving area.

2. A user program debug processing system having the following constituent element in the user program debug processing system of claim 1:

area securing means for securing, at the time the debugging of said user program is started, said currency information saving area, said variables information saving area and said stack information saving area.

3. A user program debug processing system having the following constituent element in the first user program debug processing system of claim 1:

area securing means for securing, at the time the saving command is entered, said currency information saving area, said variables information saving area and said stack information saving area.

4. A user program debug processing system for performing debugging by setting a break point in a user program, comprising:

command analysis means for perceiving, at said break point, a command entered from a terminal to be a save command;

commit means for committing, when the input of the save command is perceived by said command analysis means, the output file accessed by the user program at the break point, and attaching the identifier for said break point to that commit information;

currency information saving means for attaching, when the input of the save command is perceived by said command analysis means, the identifier for said break point to currency information designating a record at the break point of the input file accessed by the user program, and saving the currency information into a currency information saving area;

variables information saving means for attaching, when the input of the save command is perceived by said command analysis means, the identifier for said break point to variables information, which is the contents of the variables on the memory used by the user program at the break point, and saving the variables information into a variables information saving area; and stack information saving means for attaching, when the input of the save command is perceived by said command analysis means, the identifier for said break point to stack information which is called after the completion of processing by said commit means, said currency information saving means and said variables information saving means and is intended for managing the sequence of the execution of the user program at the break point, and saving the stack information into a stack information saving area.

5. A user program debug processing system having the following constituent element in the user program debug processing system of claim 4:

area securing means for securing, at the time the debugging of said user program is started, said currency information saving area, said variables information saving area and said stack information saving area.

6. A user program debug processing system having the following constituent element in the user program debug processing system of claim 4:

area securing means for securing, at the time the save command is entered, said currency information saving area, said variables information saving area and said stack information saving area.

7. A user program debug processing system for performing debugging by setting a break point in a user program, comprising:

command analysis means for perceiving, at the break point, a command entered from a terminal to be a save command or the command entered from the terminal to be a restore command having the break point attached to it;

commit means for committing, when the input of the save command is perceived by said command analysis means, the output file accessed by the user program at the break point;

currency information saving means for saving, when the input of the save command is perceived by said command analysis means, currency information designating a record at the break point of the input file accessed by the user program, into a currency information saving area;

variables information saving means for saving, when the input of the save command is perceived by said command analysis means, variables information, which is the contents of the variables on the memory used by the user program at the break point, into a variables information saving area;

stack information saving means for saving, when the input of the save command is perceived by said command analysis means, stack information which is called after the completion of processing by said commit means, said currency information saving means and said variables information saving means and is intended for managing the sequence of the execution of the user program at the break point, into a stack information saving area;

rollback means for rolling back, when the input of the restore command is perceived by said command analysis means, the output file committed by said commit means to the break point;

currency information restoring means for restoring, when the input of the restore command is perceived by said command analysis means, the currency information saved into said currency information saving area by said currency information saving means;

variables information restoring means for restoring, when the input of the restore command is perceived by said command analysis means, the variables information saved into said variables information saving means; and stack information restoring means for restoring, when the input of the restore command is perceived by said command analysis means, the stack information which was called after the completion of processing by said rollback means, said currency information restoring means and said variables information restoring means and saved into said stack information saving area by stack information saving means.

8. A user program debug processing system having the following constituent elements in the user program debug processing system of claim 7:

area securing means for securing, at the time the debugging of said user program is started, said currency information saving area, said variables information saving area and said stack information saving area; and area releasing means for releasing, at the time the debugging of said user program is completed, said currency information saving area, said variables information saving area and said stack information saving area.

9. A user program debug processing system having the following constituent elements in the user program debug processing system of claim 7:

area securing means for securing, at the time the save command is entered, said currency information saving area, said variables information saving area and said stack information saving area; and area releasing means for releasing, at the time the restoration processing according to said restore command is completed, said currency information saving area, said variables information saving area and said stack information saving area.

10. A user program debug processing system for performing debugging by setting a break point in a user program, comprising:

command analysis means for perceiving, at the break point, a command entered from a terminal to be a save command or the command entered from the terminal to be a restore command having the break point attached to it;

commit means for committing, when the input of the save command is perceived by said command analysis means, the output file accessed by the user program at the break point, and attaching an identifier of said break point to said commit information;

currency information saving means for attaching, when the input of the save command is perceived by said command analysis means, the identifier of said break point to currency information designating a record at the break point of the input file accessed by the user program, and saving the currency information into a currency information saving area;

variables information saving means for attaching, when the input of the save command is perceived by said command analysis means, the identifier of said break point to variables information, which is the contents of the variables on the memory used by the user program at the break point, and saving the variables information into a variables information saving area;

stack information saving means for attaching, when the input of the save command is perceived by said command analysis means, the identifier of said break point to stack information which is called after the completion of processing by said commit means, said currency information saving means and said variables information saving means and is intended for managing the sequence of the execution of the user program at the break point, and saving the stack information into a stack information saving area;

rollback means for rolling back, when the input of the restore command is perceived by said command analysis means, the output file committed by said commit means to the break point indicated by said restore command;

currency information restoring means for restoring to the state of the break point indicated by said restore command, when the input of the restore command is perceived by said command analysis means, the currency information saved into said currency information saving area by said currency information saving means;

variables information restoring means for restoring to the state of the break point indicated by said restore command, when the input of the restore command is perceived by said command analysis means, the variables information saved into said variables information saving means; and stack information restoring means for restoring to the state of the break point indicated by said restore command, when the input of the restore command is perceived by said command analysis means, the stack information which was called after the completion of processing by said rollback means, said currency information restoring means and said variables information restoring means and saved into said stack information saving area by said stack information saving means.

11. A user program debug processing system having the following constituent elements in the user program debug processing system of claim 10:

area securing means for securing, at the time the debugging of said user program is started, said currency information saving area, said variables information saving area and said stack information saving area; and area releasing means for releasing, at the time the debugging of said user program is completed, said currency information saving area, said variables information saving area and said stack information saving area.

12. A user program debug processing system having the following constituent elements in the user program debug processing system of claim 10:

area securing means for securing, at the time the save command is entered, said currency information saving area, said variables information saving area and said stack information saving area; and area releasing means for releasing, at the time the restoration processing according to said restore command is completed, said currency information saving area, said variables information saving area and .said stack information saving area.

* * * * *